(12) United States Patent
Mutoh

(10) Patent No.: US 9,160,562 B2
(45) Date of Patent: Oct. 13, 2015

(54) NODE AND RING INFORMATION TRANSMITTING METHOD

(75) Inventor: Ryoichi Mutoh, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 264 days.

(21) Appl. No.: 13/599,955

(22) Filed: Aug. 30, 2012

(65) Prior Publication Data
US 2012/0320798 A1    Dec. 20, 2012

Related U.S. Application Data

(63) Continuation of application No. PCT/JP2010/054630, filed on Mar. 18, 2010.

(51) Int. Cl.
*H04L 12/437* (2006.01)
*H04L 12/40* (2006.01)

(52) U.S. Cl.
CPC ........ *H04L 12/437* (2013.01); *H04L 12/40032* (2013.01)

(58) Field of Classification Search
None
See application file for complete search history.

(56) References Cited

U.S. PATENT DOCUMENTS

| | | | |
|---|---|---|---|
| 5,805,568 A | | 9/1998 | Shinbashi |
| 5,826,038 A | * | 10/1998 | Nakazumi ............ 709/251 |
| 6,304,557 B1 | * | 10/2001 | Nakazumi ............ 370/258 |
| 6,785,224 B2 | * | 8/2004 | Uematsu et al. ....... 370/222 |
| 2001/0019540 A1 | * | 9/2001 | Uematsu et al. ....... 370/258 |
| 2003/0145254 A1 | | 7/2003 | Ookawa et al. |
| 2008/0118244 A1 | * | 5/2008 | Nakada ............... 398/59 |

FOREIGN PATENT DOCUMENTS

| | | |
|---|---|---|
| EP | 0969615 A2 | 1/2000 |
| EP | 0969615 B1 | 4/2008 |
| JP | 5-191425 | 7/1993 |
| JP | 8-79290 | 3/1996 |
| JP | 9-93254 | 4/1997 |
| JP | 11-41265 | 2/1999 |
| JP | 2000-156694 | 6/2000 |
| JP | 2003-224571 | 8/2003 |

OTHER PUBLICATIONS

Patent Abstracts of Japan, Publication No. 09-093254, Published Apr. 4, 1997.
Patent Abstracts of Japan, Publication No. 2000-156694, Published Jun. 6, 2000.
Patent Abstracts of Japan, Publication No. 08-079290, Published Mar. 22, 1996.
Patent Abstracts of Japan, Publication No. 05-191425, Published Jul. 30, 1993.

(Continued)

*Primary Examiner* — Habte Mered
(74) *Attorney, Agent, or Firm* — Staas & Halsey LLP

(57) ABSTRACT

At a node, a first receiver receives ring information from a first adjacent node. A second receiver receives ring information from a second adjacent node. A first transmitter transmits ring information obtained by adding first local ring information attached between the node and the second adjacent node to the ring information received by the first receiver, to the second adjacent node. A second transmitter transmits ring information obtained by adding second local ring information attached between the node and the first adjacent node to the ring information received by the second receiver, to the first adjacent node.

7 Claims, 15 Drawing Sheets

(56) References Cited

OTHER PUBLICATIONS

Patent Abstracts of Japan, Publication No. 2003-224571, Published Aug. 8, 2003.

Patent Abstracts of Japan, Publication No. 11-041265, Published Feb. 12, 1999.

International Search Report mailed Jun. 15, 2010 in PCT/JP2010/054630.

* cited by examiner

FIG. 4

| 1 | 2 | 3 | 4 | 5 | 6 | 7 | 8 |
|---|---|---|---|---|---|---|---|
| H | T | Reserved | | | | | |

FIG. 5

| flag | | info |
|---|---|---|
| H | T | |
| 1 | 0 | 2 |
| 0 | 0 | 3 |
| 0 | 0 | 4 |
| 0 | 0 | 5 |
| 0 | 0 | 6 |
| 0 | 1 | 1 |

NODE AND RING INFORMATION TRANSMITTING METHOD

CROSS-REFERENCE TO RELATED APPLICATION

This application is a continuation application of International Application PCT/JP2010/054630 filed on Mar. 18, 2010, and designated the U.S., the entire contents of which are incorporated herein by reference.

FIELD

The embodiments discussed herein relate to a node forming a ring network and a ring information transmitting method of the node.

BACKGROUND

An OTN (Optical Transport Network) is high-speed transmission technology based on SONET/SDH (Synchronous Optical Network/Synchronous Digital Hierarchy) and designed so as to be capable of accommodating SONET/SDH and Ethernet (registered trademark) based services. The frame structure is specified by ITU-T (International Telecommunication Union Telecommunication Standardization Sector) G. 709 and the overhead has a shape similar to that of SONET/SDN. The digital layer of the OTN is formed basically by three hierarchies and accommodates a client signal in an ODU (Optical channel Data Unit) via an OPU (Optical channel Payload Unit) and maps the signal to a wavelength via an OTU (Optical channel Transport Unit).

For a network, the protection technique against failures is indispensable in terms of management. In the OTU also, the linear protection is specified in ITU-T G. 873.1.

FIG. 14 explains the linear protection. In FIG. 14, nodes 101 and 102 are illustrated. The nodes 101 and 102 have protection switch units 101a and 102a, respectively. It is assumed that the protection switch unit 101a is a bridge and the protection switch unit 102a is a selector.

Between nodes, a unique signal number is attached by, for example, an operator. For example, in the case of FIG. 14, between the nodes 101 and 102, a signal number Sig1 is attached.

In FIG. 14, between the nodes 101 and 102, paths of an active ODU and a spare ODU are established and when a failure occurs, the protection switch units 101a and 102a switch the paths for a client signal at the ODU layer level.

For example, when a failure occurs in the active ODU, the protection switch unit 101a of the node 101 transmits a switch request to the signal number Sig1 by an APS (Automatic Protection Switching) message of the spare ODU in order to request to switch the paths. Upon receipt of the switch request to the signal number Sig1 by the APS message of the spare ODU, the protection switch unit 102a of the node 102 returns its response to the protection switch unit 101a by an APS message of the spare ODU.

Due to this, the protection switch unit 101a may send out a client signal to the spare ODU and the protection switch unit 102a may receive the client signal from the spare ODU. When the recognitions at both two end nodes agree with each other, it is possible to perform switching due to a failure even if the signal number in the linear protection is not understood by a relay node.

Conventionally, in addition to the already existing services (DS1, DS3, STS-1, etc.), there is proposed an add and drop multiplexer capable of dealing with a fixed-length cell, such as an ATM (Asynchronous Transfer Mode) cell (for example, see Japanese Laid-open Patent Publication No. 09-93254). Further, an information communication system in which a misconnect or traffic drop does not occur at the time of setting of a communication path, a monitoring controller used in this information communication system, a transmission equipment, and a path setting method are proposed (for example, see Japanese Laid-open Patent Publication No. 2000-156694).

The OTN is also supposed to be operated in a ring topology and ITU-T G. 873.2 has begun reviewing of the ODU ring protection. When the same APS message as that of the linear protection is used, there used to be such a problem that a misconnect of a client signal occurs when a duplicated signal number is attached between nodes in a ring topology and path switching is performed due to the occurrence of a failure.

FIG. 15 explains a misconnect in a ring topology. In FIG. 15, nodes 111 to 116 are illustrated. The solid line double-pointed arrow illustrated in FIG. 15 indicates an active ODU and the dotted line double-pointed arrow indicates a spare ODU. It is assumed that between respective nodes 111 to 116, signal numbers Sig1 to Sig6 are attached as illustrated in FIG. 15.

Here, it is assumed that a failure has occurred in the active ODU and the spare ODU between the nodes 111 and 112. In this case, the node 111 transmits a switch request to the signal number Sig1 in which the failure has occurred by the APS message of the spare ODU to the node 116.

Because the signal number of the traffic the node 116 should terminate (receive) is 'Sig5', the node 116 establishes a crossconnect so as to let the switch request to the signal number Sig1 received at the spare ODU pass through and pass through the spare ODU. The nodes 115, 114, and 113 also let the switch request pass through similarly.

The node 112 performs switching so as to receive the signal number Sig1 from the spare ODU because the signal number of the traffic the node 112 should terminate is 'Sig1'. Upon receipt of the APS message of the switch request to the signal number Sig1, the node 112 transmits the response APS message at the spare ODU via the nodes 113 to 116. Due to this, the node 111 may send out the client signal to the spare ODU and the node 112 may receive the client signal from the spare ODU.

The above is a case where a signal number is allocated uniquely by an operator. In contrast to this, for example, when an operator attaches the signal number Sig1 (enclosed by brackets in FIG. 15) between the nodes 115 and 116, the node 116 terminates the signal number Sig1 received from the node 111 at the spare ODU. Consequently, the client signal to be transmitted from the node 111 to the node 112 at the spare ODU is terminated at the node 116, resulting in a misconnect (arrow A101 in FIG. 15). Similarly, the node 115 terminates the signal number Sig1 received from the node 112. Because of this, the client signal to be transmitted from the node 112 to the node 111 at the spare ODU is terminated at the node 115, resulting in a misconnect (arrow A102 in FIG. 15).

SUMMARY

According to an aspect of the present invention, a node forming a ring network is provided. The node has a first receiver configured to receive ring information attached between nodes from a first adjacent node, a second receiver configured to receive the ring information from a second adjacent node, a first transmitter configured to transmit, to the second adjacent node, the ring information which is obtained by adding first local ring information attached between the node and the second adjacent node to the ring information received by the first receiver, and a second transmitter configured to transmit, to the first adjacent node, the ring information which is obtained by adding second local ring information attached between the node and the first adjacent node to the ring information received by the second receiver.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates a Ring Flag region;

FIG. 5 explains ring information, an H flag, and a T flag;

DESCRIPTION OF EMBODIMENTS

Hereinafter, a first embodiment is explained in detail with reference to the drawings.

Figure 1:
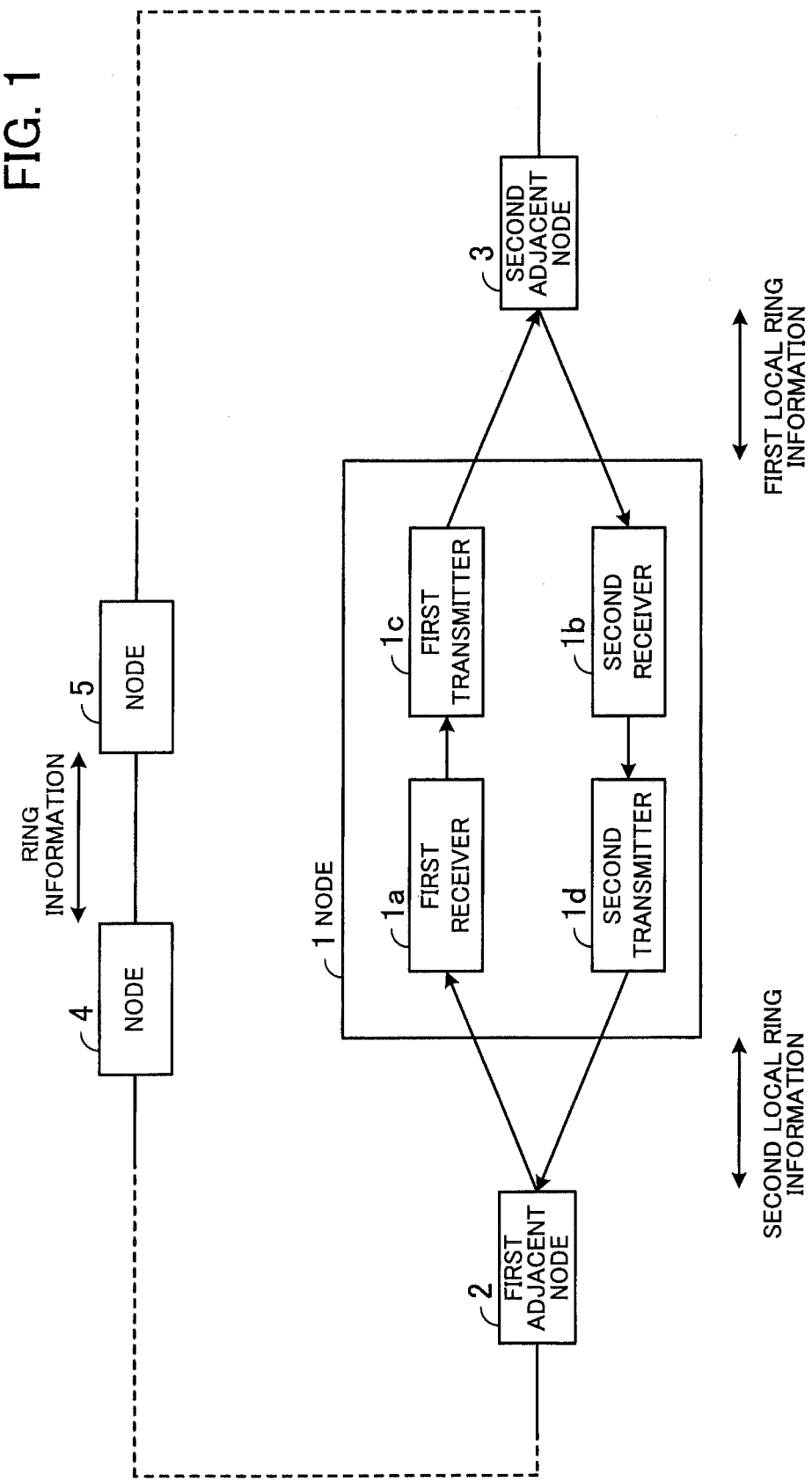
FIG. 1 illustrates nodes according to a first embodiment.

FIG. 1 illustrates nodes according to the first embodiment. FIG. 1 illustrates part of nodes forming a ring network. FIG. 1 illustrates nodes 1, 4, and 5, a first adjacent node 2 adjacent to the node 1, and a second adjacent node 3 adjacent to the node 1.

Between nodes, ring information is attached by an operator. For example, as illustrated in FIG. 1, between the node 1 and the second adjacent node 3, first local ring information is attached and between the node 1 and the first adjacent node 2, second local ring information is attached. Further, between the nodes 4 and 5 also, ring information is attached. Furthermore, between nodes, not illustrated, ring information is attached. Ring information is, for example, a signal number. In the following, the node other than the node 1 forming the ring network is sometimes called another node.

The node 1 has a first receiver 1a, a second receiver 1b, a first transmitter 1c, and a second transmitter 1d. Another node also has the same receivers and transmitters as those of the node 1.

The first receiver 1a receives ring information from the first adjacent node 2.

The second receiver 1b receives ring information from the second adjacent node 3.

The first transmitter 1c transmits ring information obtained by adding first local ring information attached between the node 1 and the second adjacent node 3 to the ring information received by the first receiver 1a, to the second adjacent node 3.

The second transmitter 1d transmits ring information obtained by adding second local ring information attached between the node 1 and the first adjacent node 2 to the ring information received by the second receiver 1b, to the first adjacent node 2.

As described above, another node forming the ring network also has the same receivers and transmitters as those of the node 1. Consequently, to the ring information, the local ring information at each node is added sequentially in the clockwise direction and the counterclockwise direction of the ring network. This enables grasping of the conditions (topologies) of the ring information attached between nodes in the clockwise direction and the counterclockwise direction of the ring network and, for example, enables detection of the duplicated setting of ring information based on the ring information in the clockwise direction and the counterclockwise direction.

As described above, the node 1 is designed so as to receive ring information from the first adjacent node 2 and the second adjacent node 3 and to transmit the ring information obtained by adding the first local ring information and the second local ring information attached between the first node and the first adjacent node 2 and the second adjacent node 3 to the received ring information. This makes it possible to detect the duplicated setting of ring information attached between the nodes of the ring network.

Next, a second embodiment is explained in detail with reference to the drawings.

Figure 2:
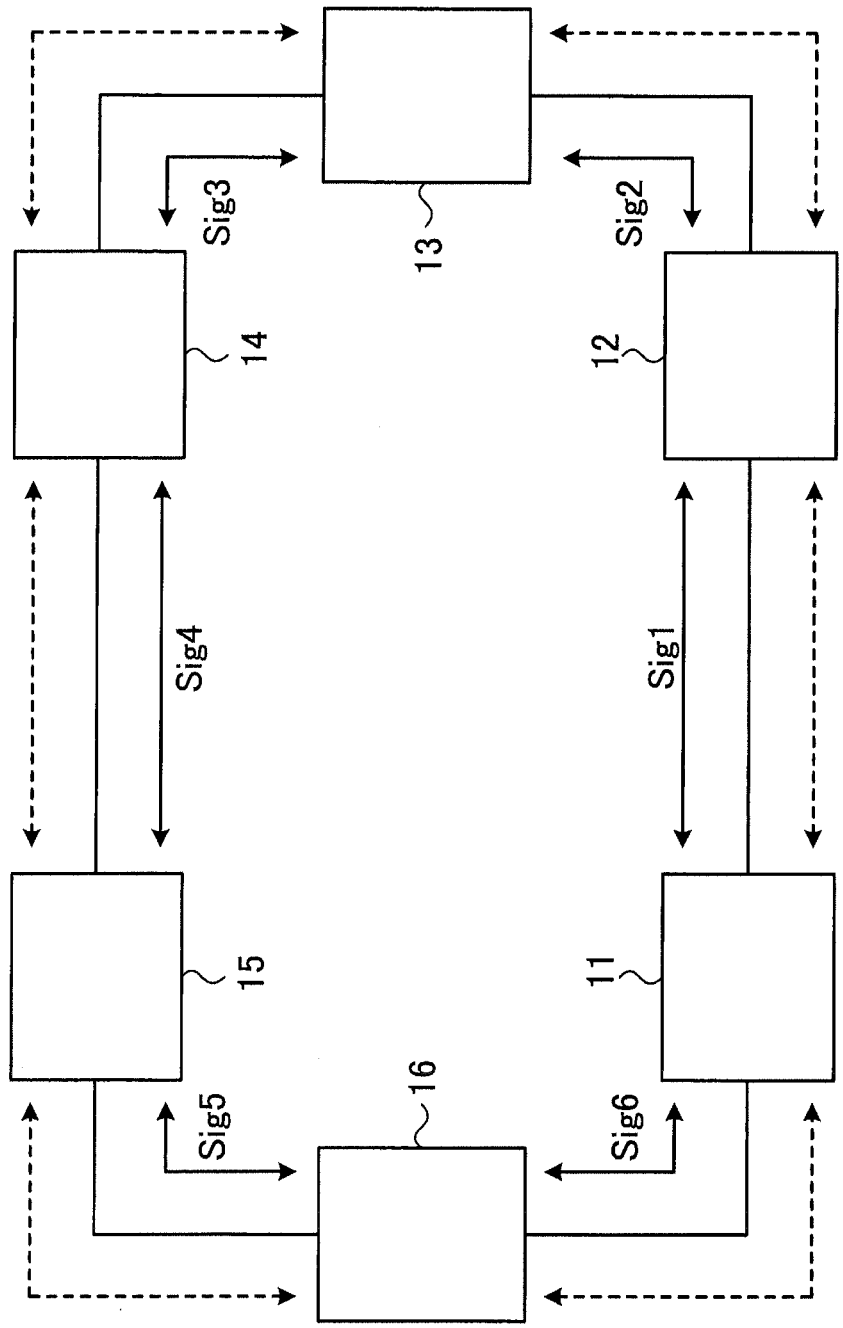
FIG. 2 illustrates a ring network to which nodes according to a second embodiment are applied.

FIG. 2 illustrates a ring network to which nodes according to the second embodiment are applied. Nodes 11 to 16 illustrated in FIG. 2 form, for example, the OTN ring network. Between adjacent nodes of the nodes 11 to 16, for example, unique ring information for distinguishing between the nodes 11 to 16 is attached, for example, by an operator. The ring information is, for example, signal numbers Sig1 to Sig6 as illustrated in FIG. 2.

In the OTN ring network, a path of an active ODU is formed at the ODU layer level as indicated by a solid line double-pointed arrow of FIG. 2 and a path of a spare ODU is formed as indicated by a dotted line double-pointed arrow. The paths of the active ODU and the spare ODU are formed, for example, in two optical fibers, respectively, between the nodes or are formed in one optical fiber with different wavelengths.

As will be described later, for example, the nodes 11 to 16 collect ring information attached to the ring network by transmitting and receiving ring information attached to the West side and the East side of each of the nodes 11 to 16 before the operation of the ring network. For example, the nodes 11 to 16 collect information of the signal numbers Sig1 to Sig6 attached to the ring network by transmitting and receiving the signal numbers Sig1 to Sig6 attached to the West sides and the East sides of the nodes 11 to 16. The nodes 11 to 16 may transmit and receive the signal numbers Sig1 to Sig6 using the active ODU or may transmit and receive the signal numbers Sig1 to Sig6 using the spare ODU.

The nodes 11 to 16 determine whether duplicated ring information is attached to the ring network based on the collected information. When duplicated ring information is attached to the ring network, the nodes 11 to 16 notify an operator etc. of that duplicated ring information is attached by, for example, issuing an alert etc. This makes it possible to prevent a misconnect of a client signal after the operation of the network.

Figure 3:
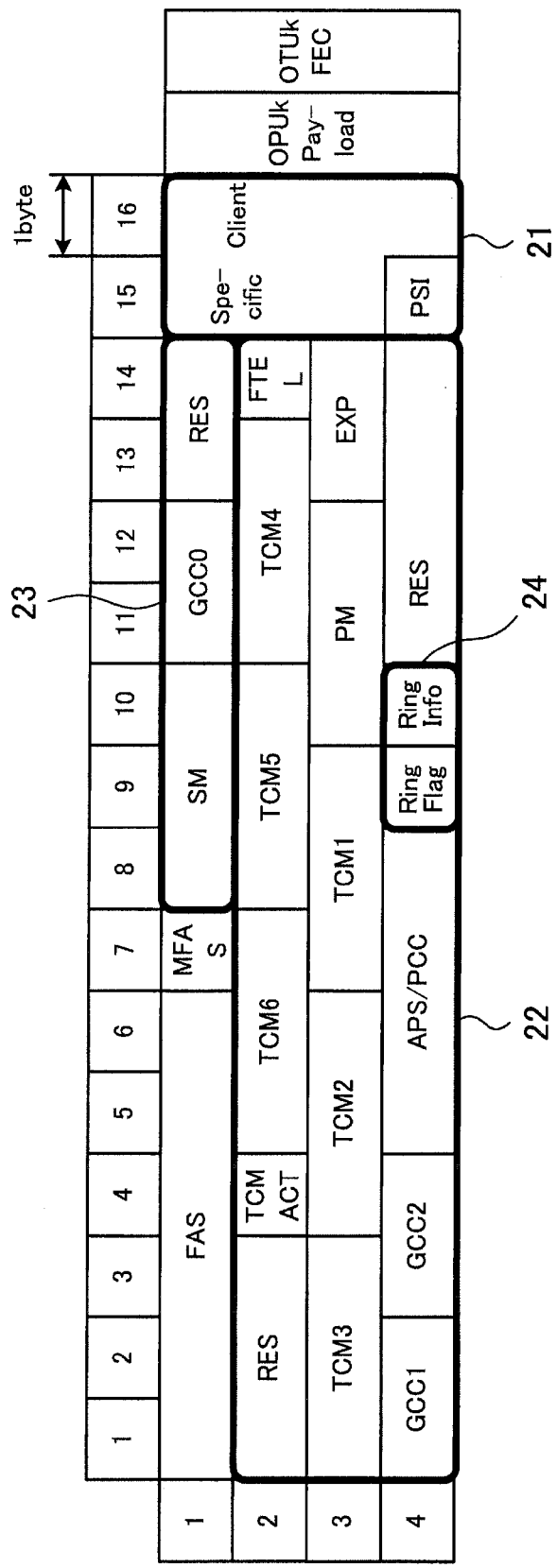
FIG. 3 illustrates a frame format of an OTN.

FIG. 3 illustrates a frame format of an OTN. The digital layer of the OTN is formed basically by three hierarchies and accommodates a client signal in the ODU via the OPU and maps the ODU to a wavelength via the OTU. A region 21 indicated by a thick frame of FIG. 3 illustrates overhead of the OPU, a region 22 illustrates overhead of the ODU, and a region 23 illustrates overhead of the OTU. The client signal is stored in 'OPUk Payload' of FIG. 3.

In the ODU overhead of the OTN frame, a reserved region (RES illustrated in FIG. 3) is provided in nine bytes. The nodes 11 to 16 perform transmission and reception of ring information using, for example, the reserved region. More specifically, the nodes 11 to 16 perform transmission and reception of ring information using a region 24 of two bytes as illustrated in FIG. 3.

As will be described later, the nodes 11 to 16 receive ring information from one of the adjacent nodes and transmit ring information obtained by adding the local ring information to the received ring information to the other adjacent node. The nodes 11 to 16 store ring information in 'Ring Info' region of the region 24 of FIG. 3 and transmit the ring information to the adjacent node.

Ring information transmitted and received between the nodes 11 to 16 has a list structure, for example, such as (2, 3, 4, 5, 6, 1). The figure indicated in the list structure represents, for example, a signal number. The 'Ring Info' region is a fixed length field of one byte, and therefore, the nodes 11 to 16 transmit pieces of ring information to the adjacent node one by one.

For example, when transmitting the above-mentioned (2, 3, 4, 5, 6, 1) to the node 12, the node 11 transmits ring information of '2' by the 'Ring Info' region of a certain frame and transmits ring information of '3' by the 'Ring Info' region of the next frame. In this manner, the node 11 sequentially transmits ring information of '4' to '1' by different frames.

In the 'Ring Flag' region of the region 24 of FIG. 3, flags indicating the head and tail of ring information the nodes 11 to 16 transmit to the adjacent node are stored. For example, the 'Ring Flag' region has a field of eight bits and the flags indicating the head and tail of the ring information are stored in two bits thereof.

Figure 4:
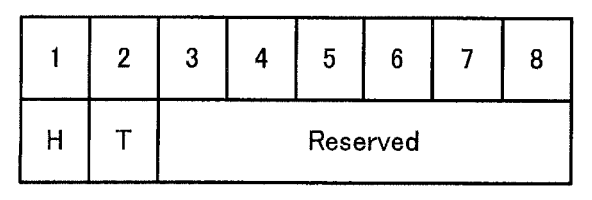

FIG. 4 illustrates a Ring Flag region. FIG. 4 illustrates the 'Ring Flag' region of the region 24 illustrated in FIG. 3. As illustrated in FIG. 4, in the first bit and the second bit of the 'Ring Flag' region, an H flag indicating the head of the ring information and a T flag indicating the tail of the ring information are stored. The third to eighth bits of 'Ring Flag' are reserved.

When transmitting the head of ring information, for example, the nodes 11 to 16 store the H flag of '1' in the first bit of the 'Ring Flag' region. Further, when transmitting the tail of ring information, the nodes 11 to 16 store the T flag of '1', for example, in the second bit of the 'Ring Flag' region. When transmitting the ring information between the head and the tail, the nodes 11 to 16 store the H flag of '0' and the T flag of '0'.

For example, it is assumed that the node 11 sequentially transmits ring information having a list structure of (2, 3, 4, 5, 6, 1) to the node 12. In this case, when transmitting '2' at the head of the ring information by the 'Ring Info' region, the node 11 stores the H flag of '1' in the 'Ring Flag' region. Further, when transmitting '1' at the tail of the ring information by the 'Ring Info' region, the node 11 stores the T flag of '1' in the 'Ring Flag' region. When transmitting '3, 4, 5, 6' between '2' and '1', the node 11 stores the H flag of '0' and the T flag of '0'.

Figure 5:
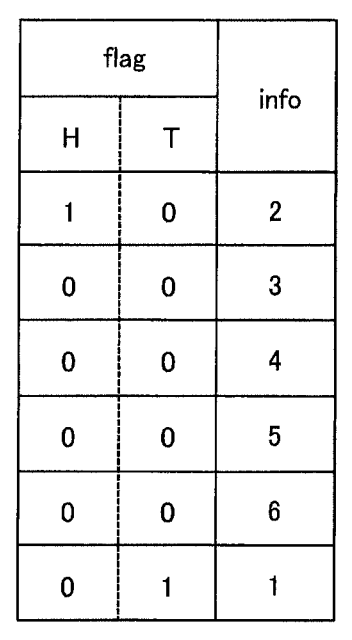

FIG. 5 explains ring information, the H flag, and the T flag. In the columns of H and T of flag illustrated in FIG. 5, the states of the H flag and the T flag are indicated. In the column of info, the ring information the node 11 transmits to the node 12 is indicated. It is assumed that the node 11 transmits ring information having a list structure of (2, 3, 4, 5, 6, 1) to the node 12.

As illustrated in FIG. 5, when transmitting the ring information of '1' at the head, the node 11 sets the H flag to '1'. When transmitting the ring information of '3, 4, 5, 6' between '2' and '1', the node 11 sets the H flag and the T flag to '0'. When transmitting the ring information of '1' at the tail, the node 11 sets the T flag to '1'. Due to this, the node 12 may appropriately receive the ring information having a list structure of (2, 3, 4, 5, 6, 1) from the node 11.

Figure 6:
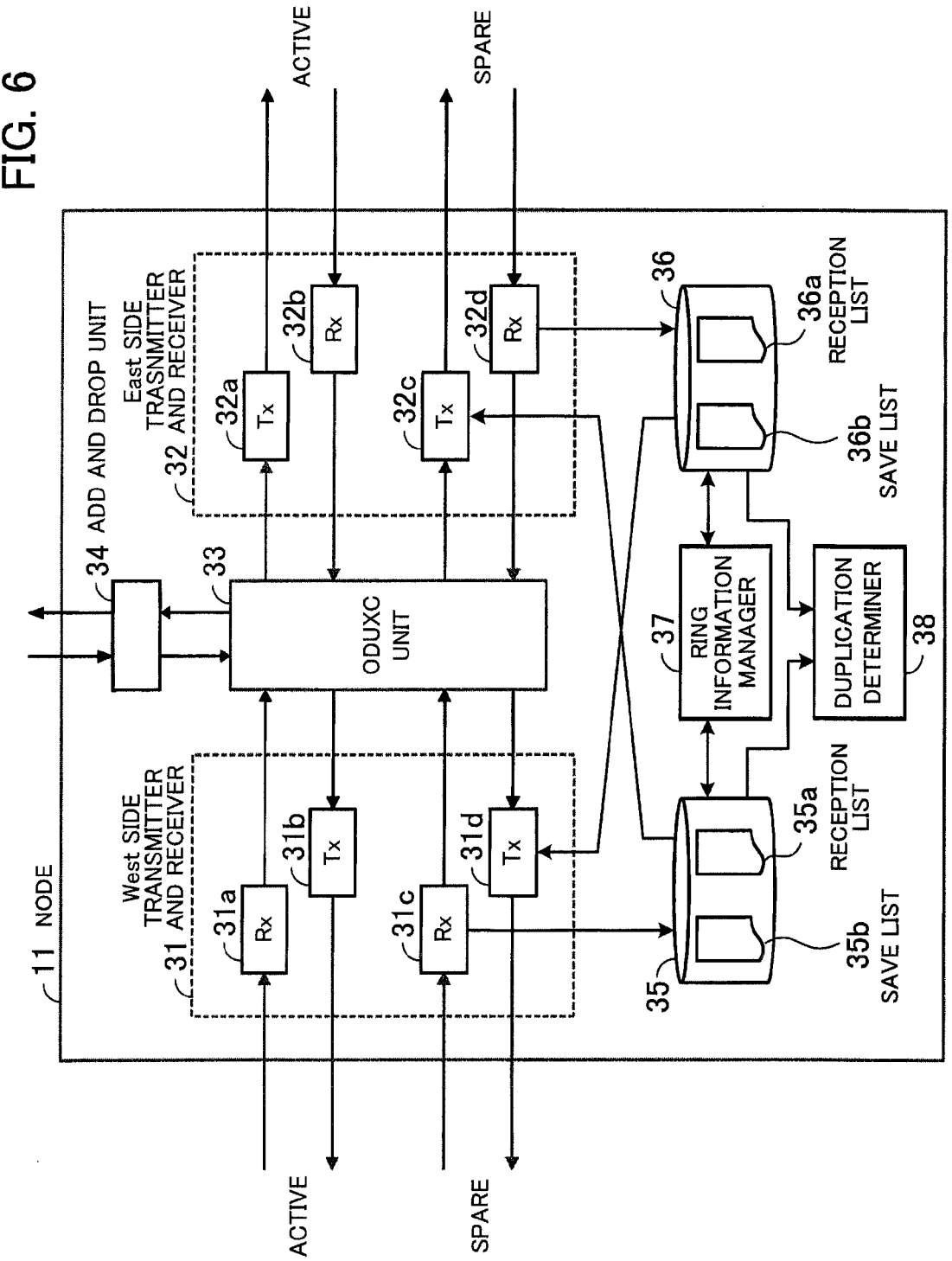
FIG. 6 is a block diagram of a node.

FIG. 6 is a block diagram of a node. As illustrated in FIG. 6, the node 11 has a West side transmitter and receiver 31, an East side transmitter and receiver 32, an ODUXC unit (ODU crossconnect unit) 33, an add and drop unit 34, ring map tables 35 and 36, a ring information manager 37, and a duplication determiner 38. The other nodes 12 to 16 forming the ring network have the same block as that of the node 11, and therefore, explanation thereof is omitted.

The West side transmitter and receiver 31 and the East side transmitter and receiver 32 perform ODU termination processing at the West side and the East side of the node 11, respectively. To the West side, for example, the node 16 illustrated in FIG. 2 is connected and to the East side, the node 12 is connected.

The West side transmitter and receiver 31 has an active Rx (receiver) 31*a* and an active Tx (transmitter) 31*b* and also has a spare Rx 31*c* and a spare Tx 31*d*. The East side transmitter and receiver 32 has an active Tx 32*a* and an active Rx 32*b* and also has a spare Tx 32*c* and a spare Rx 32*d*. The Rxes 31*a*, 31*c*, 32*b*, and 32*d* and the Txes 31*b*, 31*d*, 32*a*, and 32*c* perform ODU termination processing of a signal transmitted and received between the node 11 and the adjacent nodes.

Upon receipt of a frame having the H flag indicating the head of ring information, the Rx 31*c* extracts the ring information from the Ring Info region of the frame and stores the ring information in a reception list 35*a*. The Rx 31*c* extracts the ring information from the Ring Info region of the frame until the frame having the T flag indicating the tail of the ring information is received and sequentially stores the ring information in the reception list 35*a*.

Upon receipt of the frame having the H flag indicating the head of the ring information, the Rx 32*d* extracts the ring information from the Ring Info region of the frame and stores the ring information in a reception list 36*a*. The Rx 32*d* extracts the ring information from the Ring Info region of the frame until the frame having the T flag indicating the tail of the ring information is received and sequentially stores the ring information in the reception list 36*a*.

The Tx 31*d* outputs ring information stored in a save list 36*b* to the West side. The OTN is a synchronous network and keeps transmitting frames continuously and the Tx 31*d* sequentially transmits ring information by overhead of the frame continuously transmitted.

The Tx 32*c* outputs ring information stored in a save list 35*b* to the West side. The OTN is a synchronous network and keeps transmitting frames continuously and the Tx 32*c* sequentially transmits ring information by overhead of the frame continuously transmitted.

The ODUXC unit 33 crossconnects ODUs. The ODUXC unit 33 outputs an ODU to be dropped to the add and drop unit 34 and outputs an ODU to be added from the add and drop unit 34 to the West side transmitter and receiver 31 or the East side transmitter and receiver 32.

The add and drop unit 34 receives a signal added from a lower network node and outputs the signal to the ODUXC unit 33. Further, the add and drop unit 34 receives a signal to be dropped from the ODUXC unit 33 and outputs the signal to the lower network node.

The ring map tables 35 and 36 are provided on the West side and the East side, respectively. The ring map table 35 has the reception list 35a and the save list 35b and the ring map table 36 has the reception list 36a and the save list 36b.

The ring information manager 37 determines whether the local ring information attached between the node 11 and the adjacent node 12 connected to the East side (hereinafter, sometimes called the East side local ring information) is included in the reception list 35a. When the East side local ring information is not included in the reception list 35a, the ring information manager 37 adds the East side local ring information to the ring information stored in the reception list 35a and then stores the ring information in the save list 35b.

Further, the ring information manager 37 determines whether the local ring information attached between the node 11 and the adjacent node 16 connected to the West side (hereinafter, sometimes called the West side local ring information) is included in the reception list 36a. When the West side local ring information is not included in the reception list 36a, the ring information manager 37 adds the West side local ring information to the ring information stored in the reception list 36a and then stores the ring information in the save list 36b.

When the East side local ring information is included in the reception list 35a and the West side local ring information is included in the reception list 36a, the duplication determiner 38 compares the save list 35b and the save list 36b. When the ring information stored in the save list 35b and the ring information stored in the save list 36b are different, the duplication determiner 38 determines that duplicated ring information is set in the ring network and, for example, issues an alert etc.

In FIG. 6, the ring information is transmitted and received using the spare ring network, but, it may also be possible to transmit and receive the ring information using the active ring network.

Figure 7:
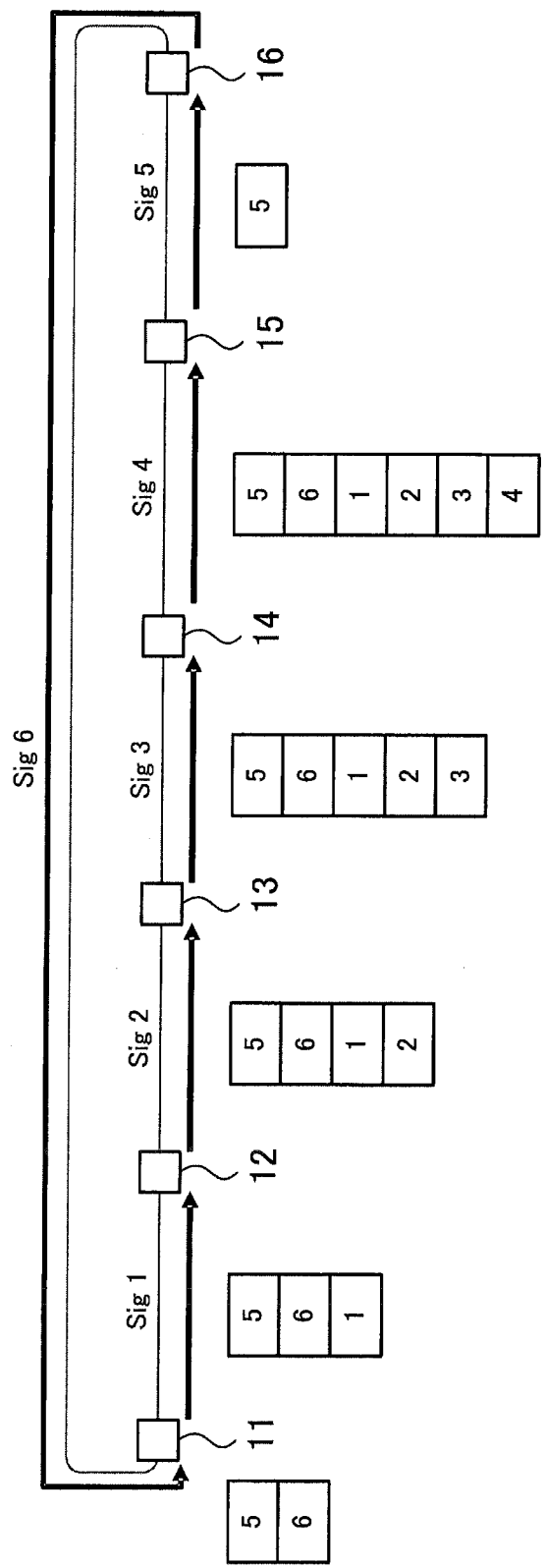
FIG. 7 explains transmission and reception of ring information.

FIG. 7 explains transmission and reception of ring information. FIG. 7 illustrates the nodes 11 to 16. Between adjacent nodes of the nodes 11 to 16, the signal numbers Sig1 to Sig6 are attached as illustrated in FIG. 7. The figure within the rectangle illustrated in FIG. 7 represents a signal number to be transmitted to the adjacent node.

Each of the nodes 11 to 16 stores a signal number attached between each node and the adjacent node on the East side in the save list of the ring map table on the West side as the initial setting. Further, each of the nodes 11 to 16 stores a signal number attached between each node and the adjacent node on the West side in the save list of the ring map table on the East side.

For example, in FIG. 7, it is assumed that the left side of each of the nodes 11 to 16 is the West side and the right side is the East side. In this case, in the save list of the ring map table on the West side of the node 15, the signal number Sig5 is stored as the initial setting. In the save list of the ring map table on the East side of the node 15, the signal number Sig4 is stored as the initial setting.

In the following, transmission and reception of ring information in the East direction (counterclockwise direction in FIG. 7) after the power source is turned on and before the network is operated with the node 15 as a reference are explained.

The node 15 transmits the signal number Sig5 stored in the save list on the West side to the node 16.

The node 16 transmits the received signal number Sig5 to the node 11 and then transmits the signal number Sig6, which is the local ring information on the East side. When transmitting the signal number Sig5, the node 16 transmits the H flag indicating that the signal number is the signal number at the head and when transmitting the signal number Sig6, the node 16 transmits the T flag indicating that the signal number is the signal number at the tail.

The node 11 receives the signal numbers Sig5 and Sig6 from the node 16 based on the H flag and the T flag.

The node 11 transmits the signal numbers Sig5 and Sig6 that are received and the signal number Sig1, which is the local ring information on the East side. When transmitting the signal number Sig5, the node 11 transmits the H flag indicating that the signal number is the signal number at the head and when transmitting the signal number Sig1, the node 11 transmits the T flag indicating that the signal number is the signal number at the tail. In this manner, the nodes 12 to 14 transmit the signal numbers to the adjacent nodes 13 to 15.

The node 15 similarly transmits the signal number Sig4 also to the West side after the power source is turned on and before the network is operated. That is, the nodes 11 to 16 perform the same transmission and reception of the signal numbers as those described above also in the clockwise direction of FIG. 7.

Similarly, the other nodes 11 to 14 and 16 transmit the signal numbers initially set to the East side and the West side after the power source is turned on and before the network is operated as in the case of the node 15. The adjacent node adds the signal number of the local node to the received signal number and further transmits the resultant signal number to the next adjacent node.

Figure 8:
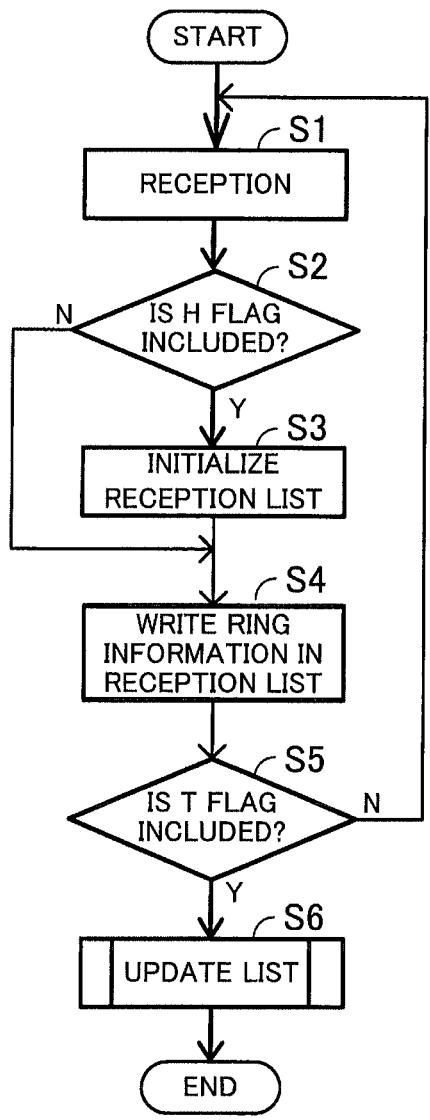
FIG. 8 is a flowchart illustrating reception processing of a node.

FIG. 8 is a flowchart illustrating reception processing of a node. In the following, reception processing of the node 11 is explained. The other nodes 12 to 16 also perform the same reception processing.

(Step S1) The Rx31c receives an OTN frame from the node 16 on the West side.

(Step S2) The Rx31c determines whether or not the H flag is included in the Ring Flag region of the received frame. When the H flag is included in the Ring Flag region of the received frame, the Rx31c proceeds to step S3. When the H flag is not included in the Ring Flag region of the received frame, the Rx31c proceeds to step S4.

(Step S3) The Rx31c initializes the reception list 35a of the ring map table 35 on the West side. For example, the Rx31c writes '0' to the reception list 35a.

(Step S4) The Rx31c writes the ring information included in the Ring Info region of the received frame to the reception list 35a.

(Step S5) The Rx31c determines whether or not the T flag is included in the Ring Flag region of the received frame. When the T flag is included in the Ring Flag region of the received frame, the Rx31c causes the procedure to proceed to step S6. When the T flag is not included in the Ring Flag region of the received frame, the Rx31c proceeds to step S1.

That is, when the T flag is included in the Ring Flag region of the received frame, all the ring information to be received (list of the ring information) has already been received, and therefore, the Rx31c causes the procedure to proceed to the processing of the next step S6. On the other hand, when the T flag is not included in the Ring Flag region of the received frame, all the ring information to be received has not been received yet, and therefore, the Rx31c returns to step S1.

(Step S6) The ring information manager 37 proceeds to list update processing to be explained in the following.

As described above, the node 11 receives the ring information to be received from the adjacent node, that is, the list of ring information by the H flag and the T flag.

In the above, the Rx31c on the West side is explained, but, the Rx32d on the East side also performs the same reception processing of ring information.

Further, in the above, the spare Rx31c is explained, but, the active Rx31a may receive ring information.

Figure 9:
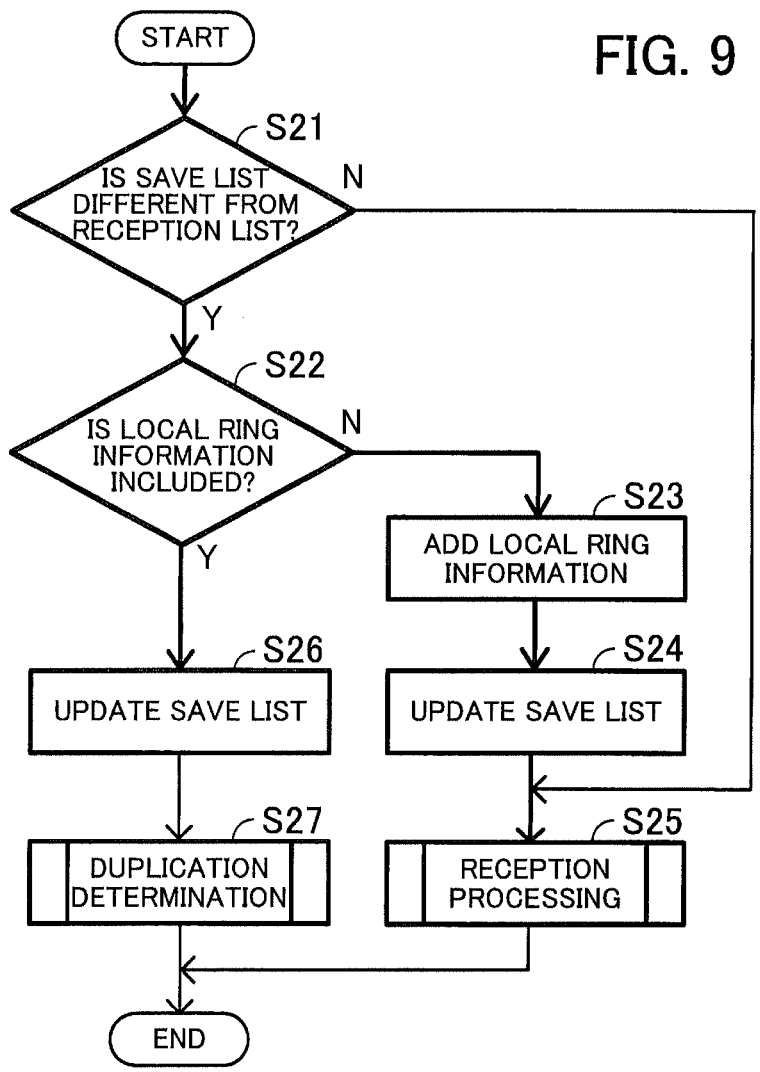
FIG. 9 is a flowchart illustrating update processing of a node.

FIG. 9 is a flowchart illustrating update processing of a node. In the following, reception processing of the node 11 is explained. The other nodes 12 to 16 also perform the same update processing.

(Step S21) The ring information manager 37 compares the list of ring information stored in the save list 35b and the list of ring information stored in the reception list 35a and when both the lists do not agree with each other, the ring information manager 37 proceeds to step S22. When both the lists agree with each other, the ring information manager 37 causes the procedure to proceed to step S25.

(Step S22) The ring information manager 37 determines whether or not the local ring information on the East side is included in the reception list 35a. That is, the ring information manager 37 determines whether or not the ring information attached between the node 11 and the adjacent node connected to the East side is included in the reception list 35a. When the local ring information on the East side is included in the reception list 35a, the ring information manager 37 proceeds to step S26. When the local ring information on the East side is not included in the reception list 35a, the ring information manager 37 proceeds to step S23.

(Step S23) The ring information manager 37 adds the local ring information on the East side to the list of ring information stored in the reception list 35a.

(Step S24) The ring information manager 37 stores the list of ring information to which the local ring information on the East side is added in the save list 35b to update the save list 35b.

(Step S25) The node 11 causes the procedure to proceed to step S1 of the reception processing explained in FIG. 8.

(Step S26) The ring information manager 37 stores the ring information stored in the reception list 35a in the save list 35b to update the save list 35b.

(Step S27) The ring information manager 37 causes the procedure to proceed to duplication determination processing, to be explained in the following.

As described above, upon receipt of ring information from the adjacent node, the node 11 determines whether or not the local ring information is included in the received ring information. When the local ring information is not included, the node 11 adds the local ring information to the ring information received from the adjacent node and stores the ring information in the save list 35b. To the ring information written in the save list 35b, the H flag and the T flag are attached and the ring information is output to the adjacent node on the West side by the Tx32c.

At step S21, the save list 35b and the reception list 35a agree with each other when the same list of ring information is received continuously from the adjacent node. If there is no change in the reception list 35a and the save list 35b, the new update processing of the save list 35b and the duplication determination processing are no longer necessary, and therefore, in this case, the ring information manager 37 returns to the reception processing explained in FIG. 8.

In the above, the ring map table 35 on the West side is explained, but, in the ring map table 36 on the East side, the update processing of the reception list 36a and the save list 36b is performed similarly.

As will be described in the following, when duplicated ring information is attached to the ring network, the node 11 determines that the local ring information is included in the reception list 35a at step S22 before receiving all the ring information. In this case, the contents of the ring information in the clockwise direction and those in the counterclockwise direction (save lists 35b and 36b) are different. Consequently, it is possible to determine whether duplicated ring information is attached to the ring network by comparing the contents of the save lists 35b and 36b.

Figure 10:
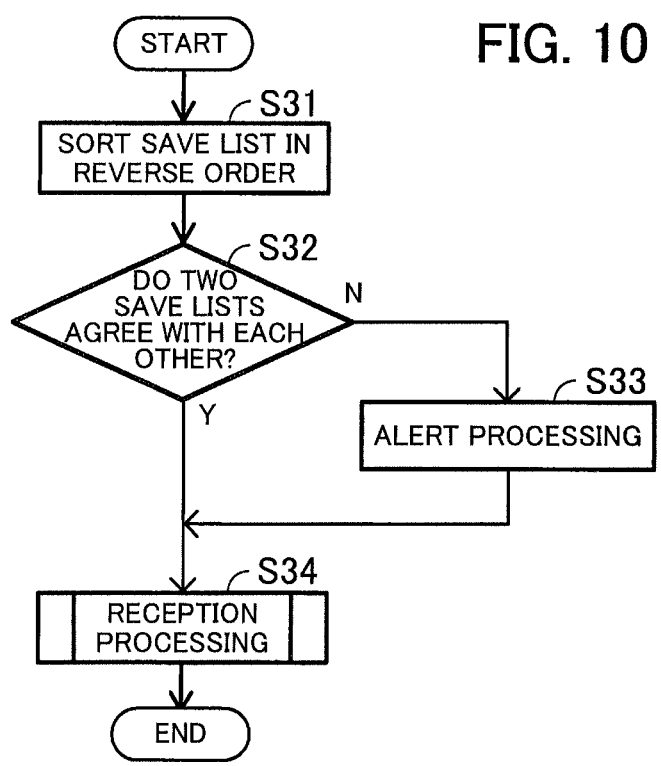
FIG. 10 is a flowchart illustrating duplication determination processing of a node.

FIG. 10 is a flowchart illustrating duplication determination processing of a node. In the following, reception processing of the node 11 is explained. The other nodes 12 to 16 also perform the same duplication determination processing.

(Step S31) The duplication determiner 38 sorts the ring information of one of the save list 35b and the save list 36b in the reverse order. For example, when the ring information of (1, 2, 3, 4, 5, 6) is stored in the save list 35b, the duplication determiner 38 sorts in the reverse order, that is, in the order of (6, 5, 4, 3, 2, 1). The reason is that in the save lists 35b and 36b, the ring information is stored in the reverse order, respectively, because of the clockwise direction and the counterclockwise direction of the ring information. In the following, it is assumed that the duplication determiner 38 sorts the ring information in the save list 35b in the reverse order.

(Step S32) The duplication determiner 38 compares the save list 35b in which the ring information is sorted in the reverse order and the save list 36b. When both the lists agree with each other, that is, when no duplicated ring information is attached to the ring network, the duplication determiner 38 proceeds to step S34. When both the lists do not agree with each other, that is, when duplicated ring information is attached to the ring network, the duplication determiner 38 proceeds to step S33.

(Step S33) The duplication determiner 38 performs alert processing. For example, the duplication determiner 38 issues an alarm sound.

(Step S34) The duplication determiner 38 causes the procedure to proceed to step S1 of the reception processing explained in FIG. 8.

As described above, when duplicated ring information is attached to the ring network, the ring information of the save list 35b does not agree with that of the save list 36b and the node 11 may issue an alert.

Figure 11:
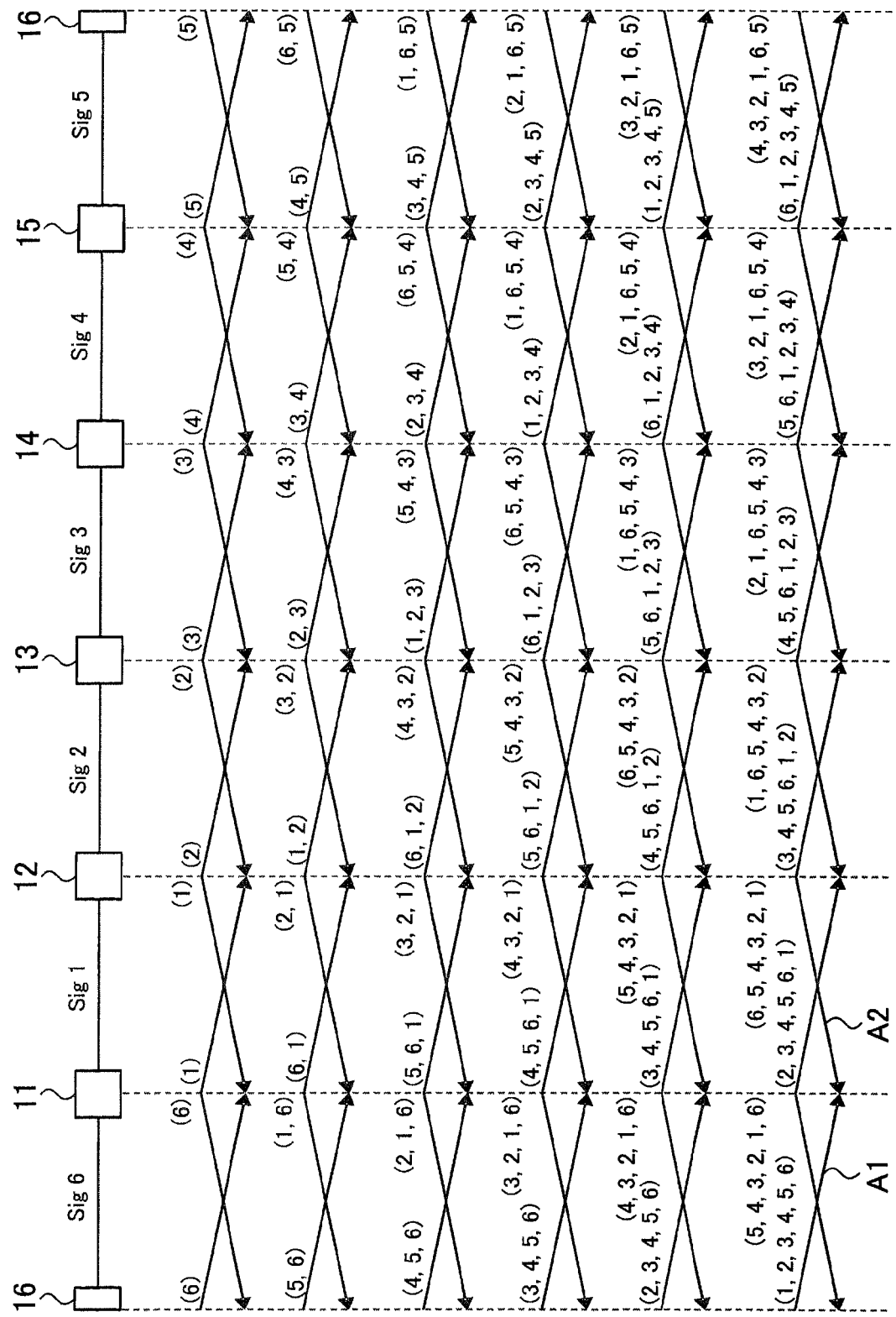
FIG. 11 illustrates transmission and reception of ring information when ring information is attached uniquely to a ring network.

FIG. 11 illustrates transmission and reception of ring information when ring information is attached uniquely to the ring network. In FIG. 11, the nodes 11 to 16 illustrated in FIG. 2 are illustrated. Further, it is assumed that between adjacent nodes of the nodes 11 to 16, the signal numbers Sig1 to Sig6, which are ring information, are attached as illustrated in FIG. 11. In FIG. 11, the node 16 is divided into two and illustrated separately for the sake of convenience in order to indicate that the network is a ring network, but, in fact, the node 16 is a single unit.

The figure within the brackets on the right side of the dotted line illustrated in FIG. 11 indicates ring information the nodes 11 to 16 transmit in the counterclockwise direction. The figure within the brackets on the left side indicates ring information the nodes 11 to 16 transmit in the clockwise direction. As illustrated in FIG. 11, the nodes 11 to 16 add the local ring information to the ring information received from one of the adjacent nodes and transmit the ring information to the other adjacent node.

As explained in the flowchart of FIG. 9, when the local ring information is included in the reception lists 35a and 36a, the nodes 11 to 16 update the save lists 35b and 36b and cause the procedure to proceed to duplication determination. For example, when receiving ring information indicated by arrows A1 and A2 of FIG. 11 and storing the ring information in the reception lists 35a and 36a, the node 11 updates the save lists 35b and 36b and causes the procedure to proceed to duplication determination.

The node 11 sorts the ring information received as indicated by the arrow A1 and compares the ring information with the ring information received as indicated by the arrow A2. In the case of FIG. 11, the ring information indicated by the arrow A1 is changed to (6, 5, 4, 3, 2, 1) by the sorting and this agrees with the ring information received as indicated by the arrow A2. In FIG. 11, no ring information is attached in a duplicated manner, and therefore, at the other nodes 12 to 16, the ring information received in the clockwise direction agrees with that received in the counterclockwise direction. Due to this, no alert is issued from the nodes 11 to 16.

Figure 12:
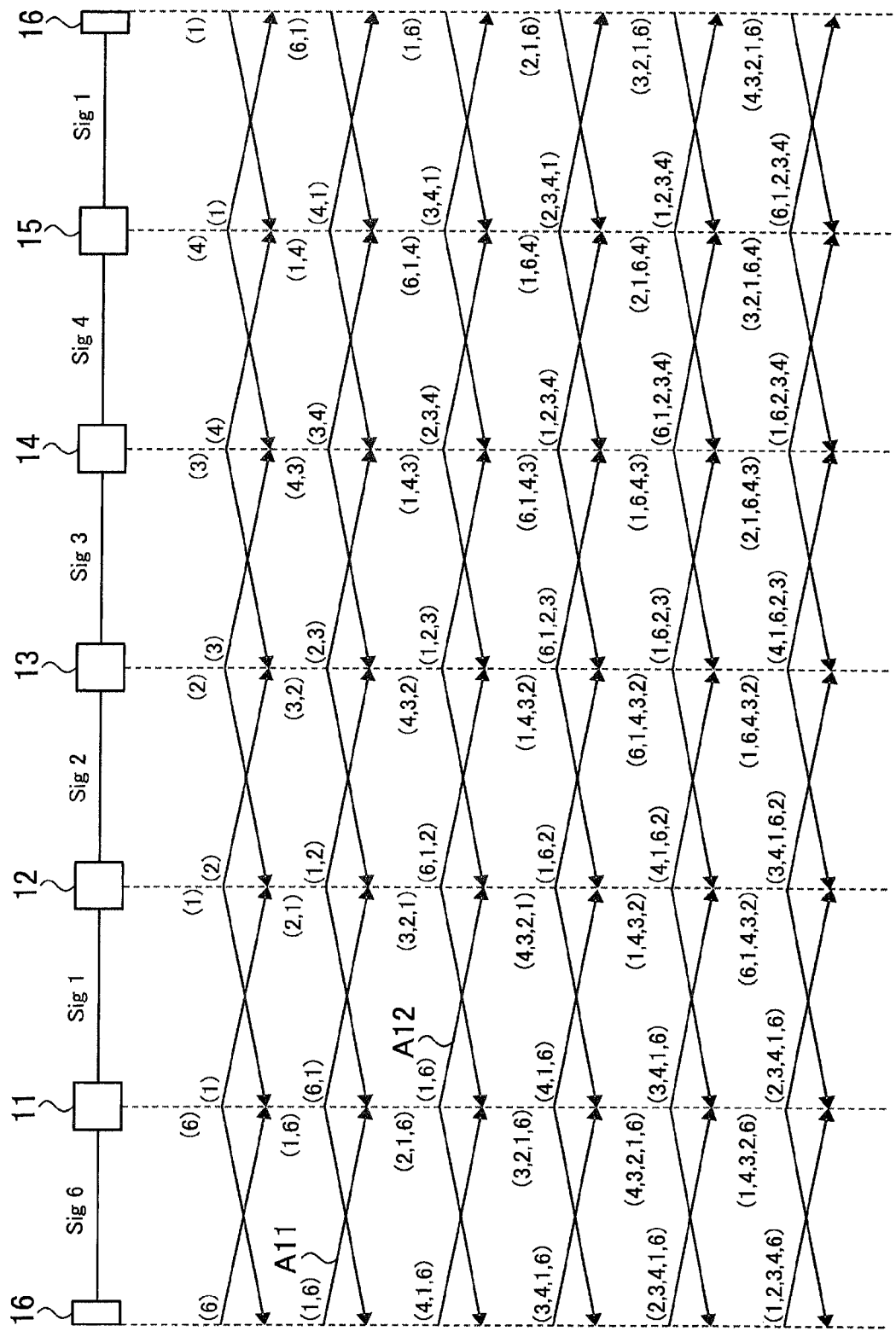
FIG. 12 illustrates transmission and reception of ring information when duplicated ring information is attached to a ring network.

FIG. 12 illustrates transmission and reception of ring information when duplicated ring information is attached to the ring network. The same symbols are attached to the same units as those in FIG. 11 and explanation thereof is omitted. FIG. 12 differs from FIG. 11 in that between the nodes 15 and 16, the same signal number Sig1 as that between the nodes 11 and 12 is attached.

When duplicated ring information is attached as in FIG. 12, for example, the node 11 receives the ring information including the local ring information (in this case, the signal number Sig1) from the node 16 before receiving all the ring information as indicated by arrow A11 as a result.

In this case, the node 11 causes the procedure to proceed to step S26 based on the determination at step S22 explained in FIG. 9 and to proceed to duplication determination. That is, the node 11 updates the save list 35b without adding the local ring information to the received ring information and causes the procedure to proceed to duplication determination. Then, the node 11 issues an alert as a result because the ring information of the save list 35b does not agree with that of the save list 36b. Further, the save list 35b is updated without the addition of the local ring information, and therefore, the node 11 transmits the ring information of (1, 6) to the adjacent node 12 as indicated by arrow A12 as a result. Furthermore, the node 11 continues to receive the ring information including the local ring information and to issue an alert until the alert is stopped by, for example, an operator.

As described above, the nodes 11 to 16 are designed so as to receive ring information from the adjacent nodes 11 to 16 and to transmit the ring information to the adjacent nodes after adding the local ring information thereto. Due to this, the nodes 11 to 16 become able to detect the duplicated setting of the ring information attached between the nodes of the ring network.

In the above, as ring information, the signal number is taken as an example, but, it may also be possible to generate ring information from a node ID (Identify). For example, in FIG. 2, the ring information on the East side of each of the nodes 11 to 16 is taken to be the node ID. More specifically, the ring information between the node 11 and the node 12 is taken to be the node ID of the node 11 and the ring information between the node 12 and the node 13 is taken to be the node ID of the node 12.

Next, a third embodiment is explained in detail with reference to the drawings. In the second embodiment, all the nodes forming the ring network are designed so as to perform transmission and reception of ring information independently and to detect duplicated attachment of ring information. In the third embodiment, one of the nodes forming the ring network is taken to be a master node and the master node detects duplicated attachment of ring information.

Figure 13:
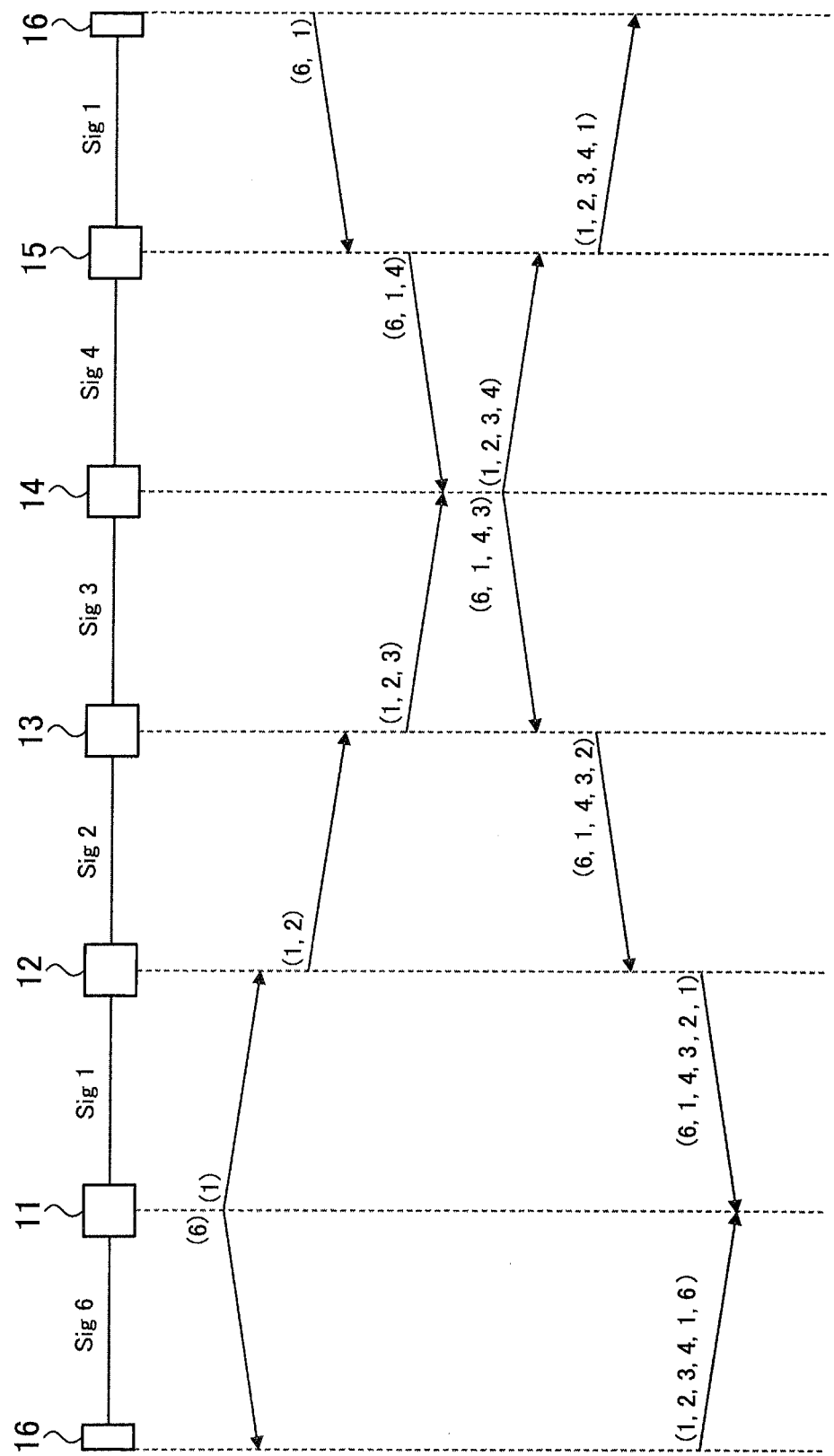
FIG. 13 illustrates transmission and reception of ring information by a master node according to a third embodiment.
Figure 14:
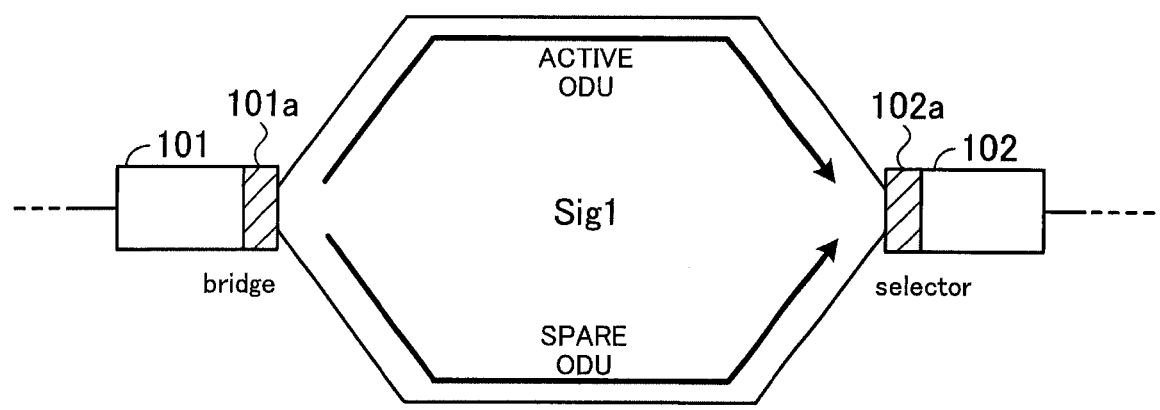
FIG. 14 explains linear protection.
Figure 15:
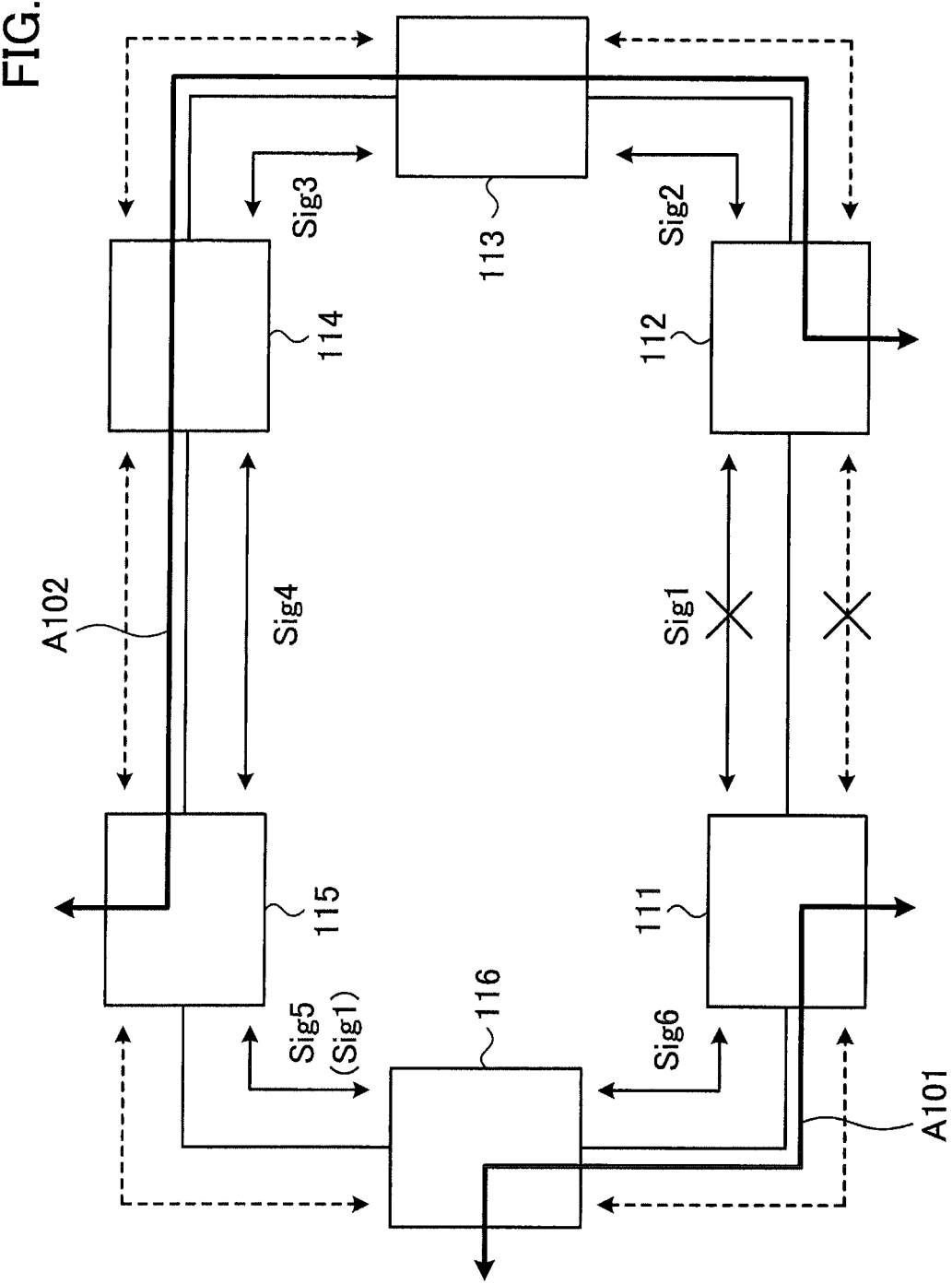
FIG. 15 explains a misconnect in a ring topology.

FIG. 13 illustrates transmission and reception of ring information by a master node according to the third embodiment. The function blocks of the nodes according to the third embodiment are the same as those of FIG. 6, but, differ in that only the master node transmits the local ring information to the adjacent nodes before the operation of the ring network and the nodes other than the master node add the local ring information to the ring information received from the adjacent node and then transmit the ring information. Further, the third embodiment differs in that only the master node determines duplication. That is, the difference lies in that the nodes other than the master node perform the reception processing of FIG. 8 and perform the processing of steps S21 and S23 to S25 of FIG. 9. Further, differently from the duplication determination processing of the second embodiment, the master node determines duplication of ring information based on the presence or absence of duplicated ring information in the ring information received in the clockwise direction and in the counterclockwise direction.

In the example of FIG. 13, it is assumed that the node 11 is the master node. For example, the master node is selected by an operator. Further, it is assumed that between adjacent nodes of the nodes 11 to 16, the signal numbers Sig1 to Sig6, which are ring information, are attached as illustrated in FIG. 11.

The node 11, the master node, transmits the local ring information in the clockwise direction and in the counterclockwise direction. For example, as illustrated in FIG. 13, the node 11 transmits the signal number Sig6 in the clockwise direction and transmits the signal number Sig1 in the counterclockwise direction.

Upon receipt of ring information from one of the adjacent nodes, the nodes 12 to 16 other than the master node add the local ring information thereto and transmit the ring information to the other adjacent node. Due to this, the master node receives the ring information having made a circuit through the ring network both in the clockwise direction and in the counterclockwise direction. For example, as illustrated in FIG. 13, the node 11 receives the ring information of (6, 1, 4, 3, 2, 1) in the clockwise direction and receives (1, 2, 3, 4, 1, 6) in the counterclockwise direction.

The node 11 determines whether or not the received ring information includes duplicated ring information. In the example of FIG. 13, '1' is duplicated in both the lists of ring information in the clockwise direction and the counterclockwise direction, and therefore, the node 11 determines that ring information is attached in a duplicated manner.

As described above, the master node transmits ring information and the other nodes add the local ring information to the received ring information and transmit the ring information to the adjacent nodes. Due to this, the master node may detect duplicated attachment of ring information based on the list contents of the ring information having circulated through the ring network.

In the above, the master node transmits ring information in both directions, that is, in the clockwise direction and in the counterclockwise direction, but, ring information may be transmitted only in one direction. For example, the node 12 may include a receiver configured to receive the signal numbers Sig1 to Sig6 attached between the nodes 11 and 16 from the adjacent node 11 and a transmitter configured to transmit the ring information obtained by adding the signal number Sig2, which is the local ring information attached between the node 12 and the adjacent node 13 to the signal numbers Sig1 to Sig6 received by the receiver, to the adjacent node 13. This also applies to the other nodes 11 to 16.

According to the node and the ring information transmitting method disclosed herein, it is made possible to detect the duplicated setting of ring information attached between the nodes of the ring network.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A node forming a ring network, comprising:
   a first receiver configured to receive ring information attached between nodes from a first adjacent node located at a first side of the node, the ring information being unique information for distinguishing between nodes on the ring network;
   a second receiver configured to receive the ring information from a second adjacent node located at a second side of the node;
   a first transmitter configured to transmit, to the second adjacent node, a first ring information which is obtained by adding first local ring information attached between the node and the second adjacent node to the ring information received by the first receiver;
   a second transmitter configured to transmit, to the first adjacent node, a second ring information which is obtained by adding second local ring information attached between the node and the first adjacent node to the ring information received by the second receiver;
   a first save list is configured to store the first ring information transmitted in a counterclockwise direction on the ring network;
   a second save list is configured to store the second information transmitted in a clockwise direction on the ring network; and
   a processing circuit which determines a duplicated ring information set in the ring network by comparing the first save list and the second save list;
   wherein each piece of the ring information is transmitted by a different frame, to the frame, a head flag indicating a head of the ring information and a tail flag indicating a tail thereof are attached, and
   a first reception list storing the ring information received by the first receiver and a second reception list storing the ring information received by the second receiver sequentially store the ring information from the ring information of the frame having the head flag to the ring information of the fame having the tail flag.

2. The node according to claim 1,
   wherein the processing circuit adds the first local ring information to the first reception list and stores the first ring information in the first save list when the first local ring information is not included in the first reception list; and
   adds the second local ring information to the second reception list and stores the second ring information in the second save list when the second local ring information is not included in the second reception list.

3. The node according to claim 2,
   wherein the first transmitter transmits the first ring information stored in the first save list to the second adjacent node, and
   the second transmitter transmits the second ring information stored in the second save list to the first adjacent node.

4. The node according to claim 3:
   wherein the processing circuit determines, when the first local ring information is included in the first reception list and the second local ring information is included in the second reception list, by comparing the first save list and the second save list, whether or not the duplicated ring information is attached.

5. The node according to claim 1,
   wherein the ring network is an optical transport network, and
   the ring information is transmitted and received using a reserved region of an overhead of an optical channel data unit.

6. The node according to claim 1,
   wherein the first transmitter and the second transmitter transmit the first local ring information and the second local ring information when the node is a master node, and transmit the first ring information and second ring information when the node is not a master node.

7. A ring information transmitting method of a node forming a ring network, comprising:
   receiving, by a first receiver, ring information attached between nodes from a first adjacent node located at a first side of the node, the ring information being unique information for distinguishing between nodes on the ring network;
   receiving, by a second receiver, the ring information from a second adjacent node located at a second side of the node;
   transmitting, by a first transmitter, to the second adjacent node, a first ring information which is obtained by adding first local ring information attached between the node and the second adjacent node to the ring information received by the first receiver;
   transmitting, by a second transmitter, to the first adjacent node, a second ring information which is obtained by adding second local ring information attached between the node and the first adjacent node to the ring information received by the second receiver;
   storing, by a first save list, the first ring information transmitted in a counterclockwise direction on the ring network;
   storing, by a second save list, the second information transmitted in a clockwise direction on the ring network; and
   determining, by a determiner, a duplicated ring information set in the ring network by comparing the first save list and the second save list;
   wherein each piece of the ring information is transmitted by a different frame, to the frame, a head flag indicating a head of the ring information and a tail flag indicating a tail thereof are attached, and
   a first reception list storing the ring information received by the first receiver and a second reception list storing the ring information received by the second receiver sequentially store the ring information from the ring information of the frame having the head flag to the ring information of the fame having the tail flag.

* * * * *